US012791892B1

(12) United States Patent
Dunn et al.

(10) Patent No.: US 12,791,892 B1
(45) Date of Patent: Nov. 10, 2026

(54) DISPLAY ASSEMBLY WITH A CONTINUOUS, CROSSING, INTERCONNECTED, INTERNAL AIRFLOW PATHWAY FOR DUAL ELECTRONIC DISPLAYS

(71) Applicant: Manufacturing Resources International, Inc., Alpharetta, GA (US)

(72) Inventors: William Dunn, Alpharetta, GA (US); Mike Brown, Cumming, GA (US); Kevin O'Connor, Duluth, GA (US); Michael Aguilar, Cumming, GA (US)

(73) Assignee: Manufacturing Resources International, Inc., Alpharetta, GA (US)

( * ) Notice: Subject to any disclaimer, the term of this patent is extended or adjusted under 35 U.S.C. 154(b) by 0 days.

(21) Appl. No.: 19/420,081

(22) Filed: Dec. 15, 2025

Related U.S. Application Data

(60) Provisional application No. 63/747,961, filed on Jan. 22, 2025, provisional application No. 63/737,834, filed on Dec. 23, 2024.

(51) Int. Cl.
*G02F 1/1333* (2006.01)

(52) U.S. Cl.
CPC .. *G02F 1/133385* (2013.01); *G02F 1/133342* (2021.01)

(58) Field of Classification Search
CPC ..................... G02F 1/133385; G02F 1/133342
See application file for complete search history.

(56) References Cited

U.S. PATENT DOCUMENTS 4,093,355 A 6/1978 Kaplit et al.
4,292,370 A 9/1981 Pekko
4,327,803 A 5/1982 Muellejans et al.
(Continued)

FOREIGN PATENT DOCUMENTS

AU 2011248190 B2 5/2011
CA 2915261 C 8/2018
(Continued)

OTHER PUBLICATIONS

Itsenclosures, Product Catalog, 2009, 48 pages.
(Continued)

*Primary Examiner* — David Y Chung
(74) *Attorney, Agent, or Firm* — Standley Law Group LLP; Jeffrey S. Standley; Adam J. Smith

(57) ABSTRACT

A display assembly with a continuous, crossing, interconnected internal airflow pathway. The display assembly includes a first and second display subassembly, each including a cover forming a forward portion of the display subassembly and a forward channel located interior to the cover. At least one of the first and second display subassembly also includes an electronic display located interior to, and spaced apart from, the cover. A common closed area is provided, at least in part, between the first and second display subassembly and is fluidly connected to the forward channels of the first and second display subassemblies. A barrier extends within the common closed area between, and spaced apart from, the first and second display subassembly, and partially partitions the common closed area.

20 Claims, 5 Drawing Sheets

(56) References Cited

U.S. PATENT DOCUMENTS

| | | | |
|---|---|---|---|
| 4,488,193 | A | 12/1984 | Davis et al. |
| 4,593,978 | A | 6/1986 | Mourey et al. |
| 4,634,225 | A | 1/1987 | Haim et al. |
| 4,748,765 | A | 6/1988 | Martin |
| 4,763,993 | A | 8/1988 | Vogeley et al. |
| 4,921,041 | A | 5/1990 | Akachi |
| 4,952,783 | A | 8/1990 | Aufderheide et al. |
| 4,952,925 | A | 8/1990 | Haastert |
| 4,976,536 | A | 12/1990 | Vogeley et al. |
| 5,002,118 | A | 3/1991 | Olmstead et al. |
| 5,029,982 | A | 7/1991 | Nash |
| 5,088,806 | A | 2/1992 | McCartney et al. |
| 5,132,666 | A | 7/1992 | Fahs |
| 5,150,231 | A | 9/1992 | Iwamoto et al. |
| 5,247,374 | A | 9/1993 | Terada |
| 5,255,029 | A | 10/1993 | Vogeley et al. |
| 5,282,114 | A | 1/1994 | Stone |
| 5,285,677 | A | 2/1994 | Oehler |
| 5,293,930 | A | 3/1994 | Pitasi |
| 5,351,176 | A | 9/1994 | Smith et al. |
| 5,432,526 | A | 7/1995 | Hyatt |
| 5,535,816 | A | 7/1996 | Ishida |
| 5,559,614 | A | 9/1996 | Urbish et al. |
| 5,621,614 | A | 4/1997 | O'Neill |
| 5,657,641 | A | 8/1997 | Cunningham et al. |
| 5,748,269 | A | 5/1998 | Harris et al. |
| 5,765,743 | A | 6/1998 | Sakiura et al. |
| 5,767,489 | A | 6/1998 | Ferrier |
| 5,808,418 | A | 9/1998 | Pitman et al. |
| 5,818,010 | A | 10/1998 | McCann |
| 5,818,694 | A | 10/1998 | Daikoku et al. |
| 5,835,179 | A | 11/1998 | Yamanaka |
| 5,864,465 | A | 1/1999 | Liu |
| 5,869,818 | A | 2/1999 | Kim |
| 5,869,919 | A | 2/1999 | Sato et al. |
| 5,903,433 | A | 5/1999 | Gudmundsson |
| 5,920,367 | A | 7/1999 | Kajimoto et al. |
| 5,991,153 | A | 11/1999 | Heady et al. |
| 6,003,015 | A | 12/1999 | Kang et al. |
| 6,007,205 | A | 12/1999 | Fujimori |
| 6,043,979 | A | 3/2000 | Shim |
| 6,089,751 | A | 7/2000 | Conover et al. |
| 6,104,451 | A | 8/2000 | Matsuoka et al. |
| 6,157,432 | A | 12/2000 | Helbing |
| 6,181,070 | B1 | 1/2001 | Dunn et al. |
| 6,191,839 | B1 | 2/2001 | Briley et al. |
| 6,198,222 | B1 | 3/2001 | Chang |
| 6,211,934 | B1 | 4/2001 | Habing et al. |
| 6,215,655 | B1 | 4/2001 | Heady et al. |
| 6,244,333 | B1 | 6/2001 | Bergh et al. |
| 6,351,381 | B1 | 2/2002 | Bilski et al. |
| 6,359,390 | B1 | 3/2002 | Nagai |
| 6,392,727 | B1 | 5/2002 | Larson et al. |
| 6,405,463 | B1 | 6/2002 | Roddy et al. |
| 6,417,900 | B1 | 7/2002 | Shin et al. |
| 6,428,198 | B1 | 8/2002 | Saccomanno et al. |
| 6,473,150 | B1 | 10/2002 | Takushima et al. |
| 6,476,883 | B1 | 11/2002 | Salimes et al. |
| 6,496,236 | B1 | 12/2002 | Cole et al. |
| 6,504,713 | B1 | 1/2003 | Pandolfi et al. |
| 6,535,266 | B1 | 3/2003 | Nemeth et al. |
| 6,628,355 | B1 | 9/2003 | Takahara |
| 6,643,130 | B1 | 11/2003 | DeMarchis et al. |
| 6,683,639 | B2 | 1/2004 | Driessen-Olde Scheper et al. |
| 6,701,143 | B1 | 3/2004 | Dukach et al. |
| 6,714,410 | B2 | 3/2004 | Wellhofer |
| 6,727,468 | B1 | 4/2004 | Nemeth |
| 6,742,583 | B2 | 6/2004 | Tikka |
| 6,800,378 | B2 | 10/2004 | Hawa et al. |
| 6,807,051 | B2 | 10/2004 | Takahashi |
| 6,812,851 | B1 | 11/2004 | Dukach et al. |
| 6,833,992 | B2 | 12/2004 | Kusaka et al. |
| 6,839,104 | B2 | 1/2005 | Taniguchi et al. |
| 6,886,942 | B2 | 5/2005 | Okada et al. |
| 6,891,135 | B2 | 5/2005 | Pala et al. |
| 6,909,486 | B2 | 6/2005 | Wang et al. |
| 6,943,768 | B2 | 9/2005 | Cavanaugh et al. |
| 7,059,757 | B2 | 6/2006 | Shimizu |
| 7,083,285 | B2 | 8/2006 | Hsu et al. |
| 7,161,803 | B1 | 1/2007 | Heady |
| 7,164,586 | B2 | 1/2007 | Lin |
| 7,170,759 | B2 | 1/2007 | Soga |
| 7,190,416 | B2 | 3/2007 | Paukshto et al. |
| 7,190,587 | B2 | 3/2007 | Kim et al. |
| 7,209,349 | B2 | 4/2007 | Chien et al. |
| 7,210,839 | B2 | 5/2007 | Jung et al. |
| 7,212,403 | B2 | 5/2007 | Rockenfell |
| 7,259,964 | B2 | 8/2007 | Yamamura et al. |
| 7,269,023 | B2 | 9/2007 | Nagano |
| 7,284,874 | B2 | 10/2007 | Jeong et al. |
| 7,342,789 | B2 | 3/2008 | Hall et al. |
| 7,396,145 | B2 | 7/2008 | Wang et al. |
| 7,447,018 | B2 | 11/2008 | Lee et al. |
| 7,452,121 | B2 | 11/2008 | Cho et al. |
| 7,457,113 | B2 | 11/2008 | Kumhyr et al. |
| 7,458,767 | B2 | 12/2008 | Wu et al. |
| 7,480,140 | B2 | 1/2009 | Hara et al. |
| 7,492,589 | B2 | 2/2009 | Park |
| 7,591,508 | B2 | 9/2009 | Chang |
| D608,775 | S | 1/2010 | Leung |
| 7,682,047 | B2 | 3/2010 | Hsu et al. |
| 7,752,858 | B2 | 7/2010 | Johnson et al. |
| 7,762,707 | B2 | 7/2010 | Kim et al. |
| 7,800,706 | B2 | 9/2010 | Kim et al. |
| 7,864,258 | B2 | 1/2011 | Cho et al. |
| 7,868,951 | B2 | 1/2011 | Maruta et al. |
| 7,903,416 | B2 | 3/2011 | Chou |
| 7,995,342 | B2 | 8/2011 | Nakamichi et al. |
| 8,004,648 | B2 | 8/2011 | Dunn |
| 8,081,267 | B2 | 12/2011 | Moscovitch et al. |
| 8,081,465 | B2 | 12/2011 | Nishiura |
| 8,102,173 | B2 | 1/2012 | Merrow |
| 8,102,483 | B2 | 1/2012 | Perry et al. |
| 8,208,115 | B2 | 6/2012 | Dunn |
| 8,241,573 | B2 | 8/2012 | Banerjee et al. |
| 8,269,916 | B2 | 9/2012 | Ohkawa |
| 8,270,163 | B2 | 9/2012 | Nakamichi et al. |
| 8,274,789 | B2 | 9/2012 | Nakamichi et al. |
| 8,320,119 | B2 | 11/2012 | Isoshima et al. |
| 8,351,014 | B2 | 1/2013 | Dunn |
| 8,358,397 | B2 | 1/2013 | Dunn |
| 8,369,083 | B2 | 2/2013 | Dunn et al. |
| 8,373,841 | B2 | 2/2013 | Dunn |
| 8,379,182 | B2 | 2/2013 | Dunn |
| 8,400,608 | B2 | 3/2013 | Takahashi et al. |
| 8,462,497 | B2 | 6/2013 | Li et al. |
| 8,472,191 | B2 | 6/2013 | Yamamoto et al. |
| 8,497,972 | B2 | 7/2013 | Dunn et al. |
| 8,590,602 | B2 | 11/2013 | Fernandez |
| 8,654,302 | B2 | 2/2014 | Dunn et al. |
| 8,678,603 | B2 | 3/2014 | Zhang |
| 8,693,185 | B2 | 4/2014 | Dunn et al. |
| 8,700,226 | B2 | 4/2014 | Schuch et al. |
| 8,711,321 | B2 | 4/2014 | Dunn et al. |
| 8,749,749 | B2 | 6/2014 | Hubbard |
| 8,755,021 | B2 | 6/2014 | Hubbard |
| 8,760,613 | B2 | 6/2014 | Dunn |
| 8,767,165 | B2 | 7/2014 | Dunn |
| 8,773,633 | B2 | 7/2014 | Dunn et al. |
| 8,804,091 | B2 | 8/2014 | Dunn et al. |
| 8,823,916 | B2 | 9/2014 | Hubbard et al. |
| 8,827,472 | B2 | 9/2014 | Takada |
| 8,854,595 | B2 | 10/2014 | Dunn |
| 8,879,042 | B2 | 11/2014 | Dunn |
| 8,976,313 | B2 | 3/2015 | Kim et al. |
| 9,069,535 | B2 | 6/2015 | Degner et al. |
| 9,338,923 | B2 | 5/2016 | Lee et al. |
| 9,448,569 | B2 | 9/2016 | Schuch et al. |
| 9,504,188 | B1 | 11/2016 | Campbell et al. |
| 9,516,485 | B1 | 12/2016 | Bowers et al. |
| 9,600,026 | B2 | 3/2017 | Birgeoglu et al. |
| 9,703,230 | B2 | 7/2017 | Bowers et al. |
| 9,743,553 | B2 | 8/2017 | Kim et al. |
| 9,756,739 | B2 | 9/2017 | Russell-Clarke et al. |

(56) References Cited

U.S. PATENT DOCUMENTS

| | | | |
|---|---|---|---|
| 9,857,618 | B2 | 1/2018 | Barnes |
| 9,861,007 | B2 | 1/2018 | Yoon et al. |
| 10,165,712 | B1 | 12/2018 | Jang et al. |
| 10,278,312 | B1 | 4/2019 | Davis et al. |
| 10,306,781 | B2 | 5/2019 | Cho et al. |
| 10,359,817 | B2 | 7/2019 | Yun et al. |
| 10,383,238 | B2 | 8/2019 | Yun et al. |
| 10,488,896 | B2 | 11/2019 | Simpson |
| 10,606,325 | B2 | 3/2020 | Degner et al. |
| 10,754,184 | B2 | 8/2020 | Wang et al. |
| 10,827,657 | B2 | 11/2020 | Lee |
| 10,905,035 | B2 | 1/2021 | Whitehead et al. |
| 10,969,615 | B2 | 4/2021 | Wang et al. |
| 10,983,382 | B2 | 4/2021 | Takase |
| 11,016,547 | B2 | 5/2021 | Whitehead et al. |
| 11,206,750 | B2 | 12/2021 | Lee et al. |
| 11,737,204 | B2 | 8/2023 | Devalla et al. |
| 11,914,241 | B1 | 2/2024 | Zhang et al. |
| 11,919,393 | B2 | 3/2024 | Dunn et al. |
| 12,035,486 | B1 | 7/2024 | Dunn et al. |
| 2001/0001459 | A1 | 5/2001 | Savant et al. |
| 2001/0019454 | A1 | 9/2001 | Tadic-Galeb et al. |
| 2001/0023914 | A1 | 9/2001 | Oddsen, Jr. |
| 2001/0032404 | A1 | 10/2001 | Hillstrom |
| 2002/0009978 | A1 | 1/2002 | Dukach et al. |
| 2002/0033919 | A1 | 3/2002 | Sanelle et al. |
| 2002/0050793 | A1 | 5/2002 | Cull et al. |
| 2002/0065046 | A1 | 5/2002 | Mankins et al. |
| 2002/0084891 | A1 | 7/2002 | Mankins et al. |
| 2002/0101553 | A1 | 8/2002 | Enomoto et al. |
| 2002/0112026 | A1 | 8/2002 | Fridman et al. |
| 2002/0122134 | A1 | 9/2002 | Kalua |
| 2002/0126248 | A1 | 9/2002 | Yoshida |
| 2002/0135741 | A1 | 9/2002 | Lee et al. |
| 2002/0148600 | A1 | 10/2002 | Bosch et al. |
| 2002/0149714 | A1 | 10/2002 | Anderson et al. |
| 2002/0154255 | A1 | 10/2002 | Gromatzky et al. |
| 2002/0164944 | A1 | 11/2002 | Haglid |
| 2002/0164962 | A1 | 11/2002 | Mankins et al. |
| 2002/0167637 | A1 | 11/2002 | Burke et al. |
| 2003/0007109 | A1 | 1/2003 | Park |
| 2003/0020679 | A1 | 1/2003 | Kojima et al. |
| 2003/0020884 | A1 | 1/2003 | Okada et al. |
| 2003/0043091 | A1 | 3/2003 | Takeuchi et al. |
| 2003/0104210 | A1 | 6/2003 | Azumi et al. |
| 2003/0128511 | A1 | 7/2003 | Nagashima et al. |
| 2003/0214785 | A1 | 11/2003 | Perazzo |
| 2004/0012722 | A1 | 1/2004 | Alvarez |
| 2004/0025389 | A1 | 2/2004 | Peterson |
| 2004/0035032 | A1 | 2/2004 | Milliken |
| 2004/0035558 | A1 | 2/2004 | Todd et al. |
| 2004/0036622 | A1 | 2/2004 | Dukach et al. |
| 2004/0036834 | A1 | 2/2004 | Ohnishi et al. |
| 2004/0103570 | A1 | 6/2004 | Ruttenberg |
| 2004/0105159 | A1 | 6/2004 | Saccomanno et al. |
| 2004/0135482 | A1 | 7/2004 | Thielemans et al. |
| 2004/0165139 | A1 | 8/2004 | Anderson et al. |
| 2004/0207981 | A1 | 10/2004 | Gorenz, Jr. et al. |
| 2004/0212548 | A1 | 10/2004 | Ruttenberg |
| 2004/0223299 | A1 | 11/2004 | Ghosh |
| 2005/0012039 | A1 | 1/2005 | Faytlin et al. |
| 2005/0012722 | A1 | 1/2005 | Chon |
| 2005/0062373 | A1 | 3/2005 | Kim et al. |
| 2005/0073632 | A1 | 4/2005 | Dunn et al. |
| 2005/0073639 | A1 | 4/2005 | Pan |
| 2005/0094039 | A1 | 5/2005 | Kim et al. |
| 2005/0127796 | A1 | 6/2005 | Olesen et al. |
| 2005/0134525 | A1 | 6/2005 | Tanghe et al. |
| 2005/0134526 | A1 | 6/2005 | Willem et al. |
| 2005/0213950 | A1 | 9/2005 | Yoshimura |
| 2005/0219841 | A1 | 10/2005 | Ikeda et al. |
| 2005/0229630 | A1 | 10/2005 | Richter et al. |
| 2005/0237714 | A1 | 10/2005 | Ebermann |
| 2005/0253699 | A1 | 11/2005 | Madonia |
| 2005/0276053 | A1 | 12/2005 | Nortrup et al. |
| 2005/0286131 | A1 | 12/2005 | Saxena et al. |
| 2006/0012958 | A1 | 1/2006 | Tomioka et al. |
| 2006/0012985 | A1 | 1/2006 | Archie et al. |
| 2006/0018093 | A1 | 1/2006 | Lai et al. |
| 2006/0034050 | A1 | 2/2006 | Wang et al. |
| 2006/0034051 | A1 | 2/2006 | Wang et al. |
| 2006/0056994 | A1 | 3/2006 | Van Lear et al. |
| 2006/0077636 | A1 | 4/2006 | Kim |
| 2006/0081366 | A1 | 4/2006 | Chiu et al. |
| 2006/0081367 | A1 | 4/2006 | Chiu et al. |
| 2006/0082271 | A1 | 4/2006 | Lee et al. |
| 2006/0092348 | A1 | 5/2006 | Park |
| 2006/0125998 | A1 | 6/2006 | Dewa et al. |
| 2006/0132699 | A1 | 6/2006 | Cho et al. |
| 2006/0133090 | A1 | 6/2006 | Noh et al. |
| 2006/0177587 | A1 | 8/2006 | Ishizuka et al. |
| 2006/0198729 | A1 | 9/2006 | Yamasaki |
| 2006/0199514 | A1 | 9/2006 | Kimura |
| 2006/0209266 | A1 | 9/2006 | Utsunomiya |
| 2006/0221270 | A1 | 10/2006 | Ioki et al. |
| 2006/0260790 | A1 | 11/2006 | Theno et al. |
| 2006/0262079 | A1 | 11/2006 | Seong et al. |
| 2006/0266499 | A1 | 11/2006 | Choi et al. |
| 2006/0266900 | A1 | 11/2006 | May et al. |
| 2006/0268194 | A1 | 11/2006 | Morimoto et al. |
| 2006/0269216 | A1 | 11/2006 | Wiemeyer et al. |
| 2006/0283579 | A1 | 12/2006 | Ghosh et al. |
| 2007/0013647 | A1 | 1/2007 | Lee et al. |
| 2007/0019419 | A1 | 1/2007 | Hafuka et al. |
| 2007/0021217 | A1 | 1/2007 | Wu et al. |
| 2007/0030879 | A1 | 2/2007 | Hatta |
| 2007/0046874 | A1 | 3/2007 | Adachi et al. |
| 2007/0047239 | A1 | 3/2007 | Kang et al. |
| 2007/0065091 | A1 | 3/2007 | Hinata et al. |
| 2007/0070615 | A1 | 3/2007 | Joslin et al. |
| 2007/0076431 | A1 | 4/2007 | Atarashi et al. |
| 2007/0103863 | A1 | 5/2007 | Kim |
| 2007/0103866 | A1 | 5/2007 | Park |
| 2007/0115686 | A1 | 5/2007 | Tyberghien |
| 2007/0126335 | A1 | 6/2007 | You et al. |
| 2007/0139929 | A1 | 6/2007 | Yoo et al. |
| 2007/0144704 | A1 | 6/2007 | Bundza et al. |
| 2007/0151164 | A1 | 7/2007 | Marshall |
| 2007/0151274 | A1 | 7/2007 | Roche et al. |
| 2007/0151664 | A1 | 7/2007 | Shin |
| 2007/0171353 | A1 | 7/2007 | Hong |
| 2007/0176885 | A1 | 8/2007 | Jun |
| 2007/0206158 | A1 | 9/2007 | Kinoshita et al. |
| 2007/0211205 | A1 | 9/2007 | Shibata |
| 2007/0212211 | A1 | 9/2007 | Chiyoda et al. |
| 2007/0217221 | A1 | 9/2007 | Lee et al. |
| 2007/0237636 | A1 | 10/2007 | Hsu |
| 2007/0251680 | A1 | 11/2007 | Kinoshita |
| 2007/0253205 | A1 | 11/2007 | Welker |
| 2007/0258211 | A1 | 11/2007 | Sonobe et al. |
| 2007/0267174 | A1 | 11/2007 | Kim |
| 2007/0274051 | A1 | 11/2007 | Horng et al. |
| 2008/0035315 | A1 | 2/2008 | Han |
| 2008/0054144 | A1 | 3/2008 | Wohlford |
| 2008/0055261 | A1 | 3/2008 | Cernasov |
| 2008/0055534 | A1 | 3/2008 | Kawano |
| 2008/0076342 | A1 | 3/2008 | Bryant et al. |
| 2008/0083527 | A1 | 4/2008 | Horng et al. |
| 2008/0099193 | A1 | 5/2008 | Aksamit et al. |
| 2008/0111936 | A1 | 5/2008 | Kim |
| 2008/0148609 | A1 | 6/2008 | Ogoreve |
| 2008/0165496 | A1 | 7/2008 | Kang et al. |
| 2008/0190210 | A1 | 8/2008 | Harish et al. |
| 2008/0209934 | A1 | 9/2008 | Richards |
| 2008/0218446 | A1 | 9/2008 | Yamanaka |
| 2008/0236005 | A1 | 10/2008 | Isayev et al. |
| 2008/0267790 | A1 | 10/2008 | Gaudet et al. |
| 2008/0283234 | A1 | 11/2008 | Sagi et al. |
| 2008/0285290 | A1 | 11/2008 | Ohashi et al. |
| 2008/0296134 | A1 | 12/2008 | Hattori et al. |
| 2008/0310116 | A1 | 12/2008 | O'Connor |
| 2008/0310158 | A1 | 12/2008 | Harbers et al. |
| 2009/0009047 | A1 | 1/2009 | Yanagawa et al. |
| 2009/0009729 | A1 | 1/2009 | Sakai |

(56) References Cited

U.S. PATENT DOCUMENTS

2009/0021461 A1 1/2009 Hu et al.
2009/0034188 A1 2/2009 Sween et al.
2009/0059518 A1 3/2009 Kakikawa et al.
2009/0065007 A1 3/2009 Wilkinson et al.
2009/0086430 A1 4/2009 Kang et al.
2009/0095819 A1 4/2009 Brown et al.
2009/0104989 A1 4/2009 Williams et al.
2009/0120629 A1 5/2009 Ashe
2009/0122218 A1 5/2009 Oh et al.
2009/0126906 A1 5/2009 Dunn
2009/0126907 A1 5/2009 Dunn
2009/0126914 A1 5/2009 Dunn
2009/0129021 A1 5/2009 Dunn
2009/0135365 A1 5/2009 Dunn
2009/0145581 A1 6/2009 Hoffman et al.
2009/0147170 A1 6/2009 Oh et al.
2009/0154096 A1 6/2009 Iyengar et al.
2009/0174626 A1 7/2009 Isoshima et al.
2009/0231807 A1 9/2009 Bouissiere
2009/0241437 A1 10/2009 Steinle et al.
2009/0244472 A1 10/2009 Dunn
2009/0266507 A1 10/2009 Turnbull et al.
2009/0279240 A1 11/2009 Karppanen
2009/0302727 A1 12/2009 Vincent et al.
2009/0306820 A1 12/2009 Simmons et al.
2009/0323275 A1 12/2009 Rehmann et al.
2010/0060861 A1 3/2010 Medin
2010/0079949 A1 4/2010 Nakamichi et al.
2010/0079979 A1 4/2010 Nakamichi et al.
2010/0142149 A1 6/2010 Nakamichi et al.
2010/0162747 A1 7/2010 Hamel et al.
2010/0171889 A1 7/2010 Pantel et al.
2010/0182562 A1 7/2010 Yoshida et al.
2010/0220249 A1 9/2010 Nakamichi et al.
2010/0226091 A1 9/2010 Dunn
2010/0232107 A1 9/2010 Dunn
2010/0238394 A1 9/2010 Dunn
2010/0315570 A1 12/2010 Mathew et al.
2010/0321887 A1 12/2010 Kwon et al.
2011/0001898 A1 1/2011 Mikubo et al.
2011/0013114 A1 1/2011 Dunn et al.
2011/0019363 A1 1/2011 Vahlsing et al.
2011/0032489 A1 2/2011 Kimoto et al.
2011/0051071 A1 3/2011 Nakamichi et al.
2011/0051369 A1 3/2011 Takahara
2011/0058326 A1 3/2011 Idems et al.
2011/0072697 A1 3/2011 Miller
2011/0075361 A1 3/2011 Nakamichi et al.
2011/0083460 A1 4/2011 Thomas et al.
2011/0083824 A1 4/2011 Rogers
2011/0085301 A1 4/2011 Dunn
2011/0085302 A1 4/2011 Nakamichi et al.
2011/0114384 A1 5/2011 Sakamoto et al.
2011/0116000 A1 5/2011 Dunn et al.
2011/0116231 A1 5/2011 Dunn et al.
2011/0122162 A1 5/2011 Sato et al.
2011/0134356 A1 6/2011 Swatt et al.
2011/0141672 A1 6/2011 Farley, Jr. et al.
2011/0141724 A1 6/2011 Erion
2011/0162831 A1 7/2011 Lee et al.
2011/0167845 A1 7/2011 Lee et al.
2011/0261523 A1 10/2011 Dunn et al.
2011/0297810 A1 12/2011 Tachibana
2012/0006523 A1 1/2012 Masahiro et al.
2012/0012295 A1 1/2012 Kakiuchi et al.
2012/0012300 A1 1/2012 Dunn et al.
2012/0014063 A1 1/2012 Weiss
2012/0020114 A1 1/2012 Miyamoto et al.
2012/0038849 A1 2/2012 Dunn et al.
2012/0044217 A1 2/2012 Okada et al.
2012/0105790 A1 5/2012 Hubbard
2012/0106081 A1 5/2012 Hubbard et al.
2012/0131936 A1 5/2012 Yoshida et al.
2012/0188481 A1 7/2012 Kang et al.
2012/0206687 A1 8/2012 Dunn et al.
2012/0223877 A1 9/2012 Cho
2012/0224116 A1 9/2012 Barnes
2012/0236499 A1 9/2012 Murayama et al.
2012/0249402 A1 10/2012 Kang
2012/0255704 A1 10/2012 Nakamichi
2012/0274876 A1 11/2012 Cappaert et al.
2012/0284547 A1 11/2012 Culbert et al.
2013/0173358 A1 7/2013 Pinkus
2013/0176517 A1 7/2013 Kim et al.
2013/0201685 A1 8/2013 Messmore et al.
2013/0242504 A1 9/2013 Cartes et al.
2013/0258659 A1 10/2013 Erion
2013/0294039 A1 11/2013 Chao
2013/0299651 A1 11/2013 McGowan et al.
2013/0344794 A1 12/2013 Shaw et al.
2014/0044147 A1 2/2014 Wyatt et al.
2014/0085564 A1 3/2014 Hendren et al.
2014/0113540 A1 4/2014 Dunn et al.
2014/0134767 A1 5/2014 Ishida et al.
2014/0184980 A1 7/2014 Onoue
2014/0190240 A1 7/2014 He et al.
2014/0313452 A1 10/2014 Dunn et al.
2014/0313666 A1 10/2014 Chin
2014/0313698 A1 10/2014 Dunn et al.
2014/0314395 A1 10/2014 Dunn et al.
2014/0334100 A1 11/2014 Yoon et al.
2014/0361138 A1 12/2014 Ramirez et al.
2015/0009625 A1 1/2015 Chin et al.
2015/0049251 A1 2/2015 Dagoun
2015/0087404 A1 3/2015 Lesley et al.
2015/0173237 A1 6/2015 Lin et al.
2015/0177750 A1 6/2015 Bailey et al.
2015/0192371 A1 7/2015 Hancock
2015/0253611 A1 9/2015 Yang et al.
2015/0264826 A1 9/2015 Dunn et al.
2015/0319882 A1 11/2015 Dunn et al.
2015/0371571 A1 12/2015 Häger
2016/0014910 A1 1/2016 Campagna et al.
2016/0041423 A1 2/2016 Dunn
2016/0162297 A1 6/2016 Shao
2016/0192536 A1 6/2016 Diaz
2016/0198588 A1 7/2016 DeMars
2016/0232822 A1 8/2016 Ward et al.
2016/0238876 A1 8/2016 Dunn et al.
2016/0242329 A1 8/2016 DeMars
2016/0265759 A1 9/2016 Na et al.
2016/0302331 A1 10/2016 Dunn
2017/0023823 A1 1/2017 Dunn et al.
2017/0053570 A1 2/2017 Cox et al.
2017/0068042 A1 3/2017 Dunn et al.
2017/0074453 A1 3/2017 Bowers et al.
2017/0083043 A1 3/2017 Bowers et al.
2017/0083062 A1 3/2017 Bowers et al.
2017/0111486 A1 4/2017 Bowers et al.
2017/0111520 A1 4/2017 Bowers et al.
2017/0111521 A1 4/2017 Bowers et al.
2017/0127579 A1 5/2017 Hubbard
2017/0147992 A1 5/2017 Bowers et al.
2017/0163519 A1 6/2017 Bowers et al.
2017/0172016 A1 6/2017 Kang
2017/0175411 A1 6/2017 Bowers et al.
2017/0188490 A1 6/2017 Dunn et al.
2017/0257978 A1 9/2017 Diaz
2017/0345346 A1 11/2017 Hong et al.
2018/0020579 A1 1/2018 Chang et al.
2018/0088368 A1 3/2018 Notoshi et al.
2018/0088398 A1 3/2018 Lee et al.
2018/0199450 A1 7/2018 Kim et al.
2018/0259806 A1 9/2018 Oh et al.
2018/0263142 A1 9/2018 Oh et al.
2018/0310439 A1 10/2018 Oh et al.
2018/0314103 A1 11/2018 Dunn et al.
2018/0317330 A1 11/2018 Dunn et al.
2018/0317350 A1 11/2018 Dunn et al.
2019/0021189 A1 1/2019 Kim et al.
2019/0089176 A1 3/2019 Dunn et al.
2019/0159363 A1 5/2019 Jang et al.
2019/0289754 A1 9/2019 Hubbard
2020/0033017 A1 1/2020 Brown et al.

(56) References Cited

U.S. PATENT DOCUMENTS

| | | | |
|---|---|---|---|
| 2020/0096797 | A1 | 3/2020 | Teragawa |
| 2020/0124104 | A1 | 4/2020 | Dickinson et al. |
| 2020/0163235 | A1 | 5/2020 | Dunn |
| 2020/0187391 | A1 | 6/2020 | Zhu et al. |
| 2020/0201402 | A1 | 6/2020 | Lee et al. |
| 2020/0241612 | A1 | 7/2020 | Moon et al. |
| 2020/0275585 | A1 | 8/2020 | Dunn |
| 2020/0319676 | A1 | 10/2020 | Dunn |
| 2020/0369169 | A1 | 11/2020 | Mercer et al. |
| 2020/0390009 | A1* | 12/2020 | Whitehead ............ G09F 9/3026 |
| 2021/0068302 | A1 | 3/2021 | North et al. |
| 2021/0165472 | A1* | 6/2021 | Chin ........................ G05D 7/06 |
| 2021/0231998 | A1 | 7/2021 | Noso et al. |
| 2021/0304644 | A1 | 9/2021 | Webster |
| 2021/0307214 | A1 | 9/2021 | Zhang et al. |
| 2021/0397010 | A1 | 12/2021 | Mou et al. |
| 2021/0400853 | A1 | 12/2021 | Choi |
| 2021/0408676 | A1 | 12/2021 | Sainz Fuertes |
| 2022/0110227 | A1 | 4/2022 | Brown |
| 2022/0121255 | A1 | 4/2022 | Wang et al. |
| 2022/0132699 | A1 | 4/2022 | Sakano et al. |
| 2022/0132707 | A1 | 4/2022 | Dunn et al. |
| 2022/0139557 | A1 | 5/2022 | Shrestha |
| 2022/0252927 | A1 | 8/2022 | Wang et al. |
| 2022/0394861 | A1 | 12/2022 | Dunn et al. |
| 2023/0030742 | A1 | 2/2023 | Dunn et al. |
| 2023/0032626 | A1 | 2/2023 | Brown |
| 2023/0056061 | A1 | 2/2023 | Dunn et al. |
| 2023/0059819 | A1 | 2/2023 | Dunn et al. |
| 2023/0160774 | A1 | 5/2023 | Dunn et al. |
| 2023/0164964 | A1 | 5/2023 | Dunn et al. |
| 2023/0200031 | A1 | 6/2023 | Dunn |
| 2024/0032238 | A1 | 1/2024 | Dunn et al. |
| 2024/0179869 | A1 | 5/2024 | Pamidighantam et al. |
| 2024/0306314 | A1 | 9/2024 | Dunn et al. |
| 2024/0357776 | A1 | 10/2024 | Jing et al. |
| 2024/0377054 | A1 | 11/2024 | Gou et al. |
| 2025/0076558 | A1 | 3/2025 | Schlaupitz et al. |
| 2025/0227902 | A1 | 7/2025 | O'Connor |

FOREIGN PATENT DOCUMENTS

| | | | |
|---|---|---|---|
| CA | 2809019 | C | 9/2019 |
| CN | 2702363 | Y | 5/2005 |
| CN | 201228893 | Y | 4/2009 |
| CN | 202838830 | U | 3/2013 |
| CN | 205788911 | U | 12/2016 |
| CN | 106304788 | A | 1/2017 |
| CN | 216697703 | U | 6/2022 |
| EP | 1408476 | A1 | 4/2004 |
| EP | 1722559 | A1 | 11/2006 |
| EP | 1762892 | A1 | 3/2007 |
| EP | 1951020 | A1 | 7/2008 |
| EP | 2225603 | A2 | 9/2010 |
| EP | 2587175 | A1 | 5/2013 |
| EP | 3040766 | A1 | 7/2016 |
| FR | 2893752 | A1 | 5/2007 |
| GB | 2402205 | A | 12/2004 |
| JP | 402062015 | A | 3/1990 |
| JP | 402307080 | A | 12/1990 |
| JP | 3153212 | A | 7/1991 |
| JP | H497194 | A | 3/1992 |
| JP | H06-2337 | U | 1/1994 |
| JP | 6082745 | A | 3/1994 |
| JP | H8-54834 | A | 2/1996 |
| JP | H8-55567 | A | 2/1996 |
| JP | 8115788 | A | 5/1996 |
| JP | H8-152604 | A | 6/1996 |
| JP | 8194437 | A | 7/1996 |
| JP | H08-305301 | A | 11/1996 |
| JP | 8339034 | A | 12/1996 |
| JP | H9-160512 | A | 6/1997 |
| JP | H09246766 | A | 9/1997 |
| JP | H10152604 | A | 6/1998 |
| JP | H-10222076 | A | 8/1998 |
| JP | H11-68363 | A | 3/1999 |
| JP | 11160727 | A | 6/1999 |
| JP | H-11233967 | A | 8/1999 |
| JP | H11296094 | A | 10/1999 |
| JP | 2000-10501 | A | 1/2000 |
| JP | 2000112033 | A | 4/2000 |
| JP | 2000131682 | A | 5/2000 |
| JP | 3118907 | B2 | 10/2000 |
| JP | 2001209125 | A | 8/2001 |
| JP | 2001209126 | A | 8/2001 |
| JP | 2001326488 | A | 11/2001 |
| JP | 2002-6282 | A | 1/2002 |
| JP | 2002006757 | A | 1/2002 |
| JP | 2002148714 | A | 5/2002 |
| JP | 2002158475 | A | 5/2002 |
| JP | 2003036032 | A | 2/2003 |
| JP | 2003-162228 | A | 6/2003 |
| JP | 2003173147 | A | 6/2003 |
| JP | 2004-199675 | A | 7/2004 |
| JP | 2004193002 | A | 7/2004 |
| JP | 2004285940 | A | 10/2004 |
| JP | 2004286940 | A | 10/2004 |
| JP | 2005017434 | A | 1/2005 |
| JP | 2005017556 | A | 1/2005 |
| JP | 2005134849 | A | 5/2005 |
| JP | 2005181799 | A | 7/2005 |
| JP | 2005265922 | A | 9/2005 |
| JP | 2005292939 | A | 10/2005 |
| JP | 2005332253 | A | 12/2005 |
| JP | 2006010851 | A | 1/2006 |
| JP | 2006-32890 | A | 2/2006 |
| JP | 2006148047 | A | 6/2006 |
| JP | 2006163217 | A | 6/2006 |
| JP | 2006-176112 | A | 7/2006 |
| JP | 2006198344 | A | 8/2006 |
| JP | 2006293062 | A | 10/2006 |
| JP | 2006317494 | A | 11/2006 |
| JP | 2006-330196 | A | 12/2006 |
| JP | 2007003638 | A | 1/2007 |
| JP | 2007052951 | A | 3/2007 |
| JP | 2007207595 | A | 8/2007 |
| JP | 2007-293105 | A | 11/2007 |
| JP | 09307257 | A | 11/2007 |
| JP | 2007322718 | A | 12/2007 |
| JP | 2008010361 | A | 1/2008 |
| JP | 2008292743 | A | 12/2008 |
| JP | 2010024624 | A | 2/2010 |
| JP | 2010-102227 | A | 5/2010 |
| JP | 2010-282109 | A | 12/2010 |
| JP | 2011-75819 | A | 4/2011 |
| JP | 2012-133254 | A | 7/2012 |
| JP | 2014-225595 | A | 12/2014 |
| JP | 6039450 | B2 | 12/2016 |
| KR | 20000000118 | U | 1/2000 |
| KR | 200163508 | Y1 | 7/2000 |
| KR | 20000047899 | A | 7/2000 |
| KR | 200206768 | Y1 | 12/2000 |
| KR | 20010044073 | A | 6/2001 |
| KR | 200236278 | Y1 | 10/2001 |
| KR | 200286961 | Y1 | 8/2002 |
| KR | 100673470 | B1 | 1/2004 |
| KR | 200366674 | Y1 | 11/2004 |
| KR | 20050033986 | A | 4/2005 |
| KR | 20050036254 | A | 4/2005 |
| KR | 200401354 | Y1 | 11/2005 |
| KR | 20060016469 | A | 2/2006 |
| KR | 20060054742 | A | 5/2006 |
| KR | 20060091898 | A | 8/2006 |
| KR | 20060120904 | A | 11/2006 |
| KR | 100659339 | B1 | 12/2006 |
| KR | 100666961 | B1 | 1/2007 |
| KR | 20070002494 | A | 1/2007 |
| KR | 1020070070675 | A | 4/2007 |
| KR | 20070048296 | A | 5/2007 |
| KR | 1020070048294 | | 8/2007 |
| KR | 20080005024 | A | 1/2008 |
| KR | 20080010091 | A | 1/2008 |
| KR | 20080018486 | A | 2/2008 |
| KR | 20080047241 | A | 5/2008 |

(56) References Cited

FOREIGN PATENT DOCUMENTS

| | | | |
|---|---|---|---|
| KR | 20090116368 | A | 11/2009 |
| KR | 10-1153923 | B1 | 6/2012 |
| KR | 10-2013-0126034 | A | 11/2013 |
| WO | WO2005079129 | A1 | 8/2005 |
| WO | WO2007/116117 | A1 | 10/2007 |
| WO | WO2008050660 | A2 | 5/2008 |
| WO | WO2008085138 | A | 7/2008 |
| WO | WO2008/102050 | A1 | 8/2008 |
| WO | WO2009/047390 | A1 | 4/2009 |
| WO | WO2010080624 | A2 | 7/2010 |
| WO | WO2013/182733 | A1 | 12/2013 |
| WO | WO2016102982 | A1 | 6/2016 |
| WO | WO2020/081687 | A1 | 4/2020 |

OTHER PUBLICATIONS

Itsenclosures, Standard Product Data Sheet, 2011, 18 pages.
Sunbritetv, All Weather Outdoor LCD Television Model 4610HD, 2008, 1 page.
Sunbritetv, Introduces Two New All-Weather Outdoor Televisions InfoComm 2008, 7 pages.
Itsenclosures, Viewstation, 2017, 16 pages.
Novitsky, Driving LEDs versus CCFLs for LCD backlighting, Nov. 12, 2007, 6 pages.
Federman, Cooling Flat Panel Displays, 2011, 4 pages.
Zeeff, T.M., EMC analysis of an 18" LCD monitor, 2000, 1 page.
Vertigo Digital Displays, Innovation on Display FlexVu Totem Brochure, 2014, 6 pages.
Vertigo Digital Displays, FlexVu Totem Shelter, 2017, 2 pages.
Vertigo Digital Displays, All Products Catalogue, 2017,14 pages.
Adnation, Turn Key Advertising Technology Solutions, May 23, 2017, 4 pages.
CIVIQ Smartscapes, FlexVue Ferro 55P/55L, Mar. 16, 2017, 4 pages.
Wankhede, Evaluation of Cooling Solutions for Outdoor Electronics, Sep. 17-19, 2007, 6 pages.
Bureau of Ships Navy Department, Guide Manual of Cooling methods for Electronic Equipment, Mar. 31, 1955, 212 pages.
CIVIQ, Invalidity Claim Charts, Appendix A—Appendix D, Jan. 24, 2018, 51 pages.
CIVIQ, Invalidity Contentions, Jan. 24, 2018, 51 pages.
Scott, Cooling of Electronic Equipment, Apr. 4, 1974, 119 pages.
Sergent, Thermal Management Handbook for Electronic Assemblies, Aug. 14, 1998, 190 pages.
Steinberg, Cooling Techniques for Electronic Equipment First Edition, 1980, 255 pages.
Steinberg, Cooling Techniques for Electronic Equipment Second Edition, 1991, 299 pages.
Yeh, Thermal Management of Microelectronic Equipment, Oct. 15, 2002, 148 pages.
CIVIQ, Invalidity Claim Chart, Appendix I, Mar. 22, 2018, 4 pages.
CIVIQ, Invalidity Claim Charts, Appendix F to H, Mar. 22, 2018, 18 pages.
Yung, Using Metal Core Printed Circuit Board as a Solution for Thermal Management article, 2007, 5 pages.
*CIVIQ Smartscapes, LLC* V. *Manufacturing Resources International, Inc.*, Memorandum Opinion re claim construction, Sep. 27, 2018, 16 pages.
*CIVIQ Smartscapes, LLC* V. *Manufacturing Resources International, Inc.*, Claim Construction Order, Oct. 3, 2018, 2 pages.
Anandan, Munismay, Progress of LED backlights for LCDs, Journal of the SID, 2008, pp. 287-310, 16/2.
Melford Technologies, Part 2, video online at https://m.youtube.com/watch?v=znlyHWozwDA, Oct. 21, 2019, 1 page.
Mentley, David E., State of Flat-Panel Display Technology and Future Trends, Proceedings of the IEEE, Apr. 2002, vol. 90, No. 4, pp. 453-459.
Rohsenow, Warren M., Handbook of Heat Transfer, Third Edition, 1998, select chapters, 112 pages, McGraw-Hill.
The American Heritage College Dictionary, Third Edition, 1993, excerpt, 3 pages, Houghton Mifflin Company.
*CIVIQ Smartscapes LLC.* V *Manufacturing Resources International, Inc.*, Petition for Inter Partes Review of U.S. Pat. No. 8,854,572 including Declaration of Greg Blonder in Support of Petition, Curriculum Vitae of Greg Blonder and Prosecution History of U.S. Pat. No. 8,854,572, Petition filed Mar. 14, 2018, 427 pages.
*CIVIQ Smartscapes LLC.* V *Manufacturing Resources International, Inc.*, Defendant's Amended Answer and Counterclaims to Plaintiff's First Amended Complaint, Filed Apr. 24, 2018, 240 pages.
*CIVIQ Smartscapes, LLC* V. *Manufacturing Resources International, Inc.*, Memorandum Order re "rear surface of the electronic display" term construction, Mar. 5, 2019, 3 pages.
United States International Trade Commission, *Manufacturing Resources International, Inc.* v *Samsung Electronics Co., Ltd et al.*, In the Matter of Certain Outdoor and Semioutdoor Electronic Displays, Products Containing Same, and Components Thereof, Inv. No. 337-TA-1331, Final Initial Determination of Violation of Section 337, Public Version, Nov. 13, 2023, 325 pages.
Declaration of Robert Smith Gillespie, Certain Outdoor and Semi-outdoor Electronic Displays, Products, Containing same, and Components thereof, Jan. 17, 2023, 42 pages.
*Samsung Electronics Co., Ltd. and Samsung Electronics America, Inc.* v *Manufacturing Resources International, Inc.*, Declaration of Michael Gershowitz, Sep. 26, 2023, 77 pages.
*Samsung Electronics Co., Ltd. and Samsung Electronics America, Inc.* v *Manufacturing Resources International*, Inc., Expert Declaration of Dr. Himanshu Pokhama,, Sep. 26, 2023, 104 pages.
*Samsung Electronics Co., Ltd. and Samsung Electronics America, Inc.* v *Manufacturing Resources International, Inc.*, Decision to Institute IPR2023-00199, Jun. 20, 2023, 53 pages.
*Samsung Electronics Co., Ltd. and Samsung Electronics America, Inc.* v *Manufacturing Resources International, Inc.*, Decision to Institute IPR2023-00220, Jun. 20, 2023, 51 pages.
*Samsung Electronics Co., Ltd. and Samsung Electronics America, Inc.* v *Manufacturing Resources International, Inc.*, Decision to Institute IPR2023-00221, Jun. 20, 2023, 80 pages.
*Samsung Electronics Co., Ltd. and Samsung Electronics America, Inc.* v *Manufacturing Resources International, Inc.*, Decision to Institute IPR2023-00254, Jun. 20, 2023, 72 pages.
*Samsung Electronics Co., Ltd. and Samsung Electronics America, Inc.* v *Manufacturing Resources International, Inc.*, Decision to Institute IPR2023-00255, Jul. 18, 2023, 47 pages.
*Samsung Electronics Co., Ltd. and Samsung Electronics America, Inc.* v *Manufacturing Resources International, Inc.*, Final Written Decision IPR2023-00199, Jul. 3, 2024, 78 pages.
*Samsung Electronics Co., Ltd. and Samsung Electronics America, Inc.* v *Manufacturing Resources International, Inc.*, Final Written Decision IPR2023-00220, Jul. 3, 2024, 78 pages.
*Samsung Electronics Co., Ltd. and Samsung Electronics America, Inc.* v *Manufacturing Resources International, Inc.*, Final Written Decision IPR2023-00254, Jul. 3, 2024, 114 pages.
*Samsung Electronics Co., Ltd. and Samsung Electronics America, Inc.* v *Manufacturing Resources International, Inc.*, Final Written Decision IPR2023-00221, Jul. 3, 2024, 116 pages.
*Samsung Electronics Co., Ltd. and Samsung Electronics America, Inc.* v *Manufacturing Resources International, Inc.*, Final Written Decision IPR2023-00255, Jul. 30, 2024, 94 pages.

* cited by examiner

DISPLAY ASSEMBLY WITH A CONTINUOUS, CROSSING, INTERCONNECTED, INTERNAL AIRFLOW PATHWAY FOR DUAL ELECTRONIC DISPLAYS

CROSS-REFERENCE TO RELATED APPLICATIONS

This application claims the benefit of U.S. provisional application Ser. No. 63/737,834 filed Dec. 23, 2024, and U.S. provisional application Ser. No. 63/747,961 filed Jan. 22, 2025, the disclosures of which are hereby incorporated by reference as if fully restated herein.

TECHNICAL FIELD

Exemplary embodiments relate generally to display assemblies with a continuous, crossing, interconnected, internal airflow pathway for dual electronic displays as well as systems and methods related to the same.

BACKGROUND AND SUMMARY OF THE INVENTION

Digital out of home ("DOOH") advertising is an increasingly popular field. These DOOH assemblies are sometimes used to show advertising and/or public announcements.

Generally, these display assemblies (sometimes may also be referred to herein as a "unit") include one or more electronic displays placed within a ruggedized enclosure. The electronic display(s) and associated equipment generate heat. Heat is also generated based on solar loading and the environment. As such, there is generally a need to cool or otherwise thermally manage such units.

Display assemblies with a continuous, crossing, interconnected, internal airflow pathway for dual electronic displays as well as systems and methods related to the same are provided. The display assembly may include a common, closed area between dual display subassemblies. A forward channel may extend in front of an electronic display and behind a cover of each of the display subassemblies. The forward channel may be connected to the common, closed area at opposing sides of the electronic display (e.g., either top/bottom or left/right).

A barrier may extend within a portion of the closed, common area. In exemplary embodiments, the barrier extends at least substantially (e.g., within 90%) parallel with a rear surface of the display subassemblies. The barrier may comprise a panel or other at least substantially (e.g., within 90%) planar member which is coextensive with at least a majority of the rear surface of the display subassemblies. In exemplary embodiments, without limitation, the barrier is coextensive with an amount of a surface area of the rear surface of the display subassemblies between about 51% and 76% thereof. In other exemplary embodiments, without limitation, the barrier is coextensive with less than a majority of the amount of the surface area of the rear surface of the display subassemblies, such as between about 49% and 5%.

Each of the display subassemblies may comprise one or more fans, which may be located at a rear surface thereof, such as at one side thereof. When activated, the fans may create the continuous, crossing, interconnected airflow of the circulating gas between the display subassemblies. In exemplary embodiments, without limitation, the circulating gas may travel through the fan of the first one of the display subassemblies and into the front channel thereof before exiting the front channel into the closed, common area where the circulating gas is guided and/or confined by the barrier through the fan of a second one of the display subassemblies and into the front channel thereof before returning to the closed, common area where it is guided and/or confined by the barrier to the fan of the first one of the display subassemblies to make a circuit.

Further features and advantages of the systems and methods disclosed herein, as well as the structure and operation of various aspects of the present disclosure, are described in detail below with reference to the accompanying figures.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical, similar, or equivalent features, and wherein.

DETAILED DESCRIPTION OF EXEMPLARY EMBODIMENT(S)

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Embodiments of the invention are described herein with reference to illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Figure 1:
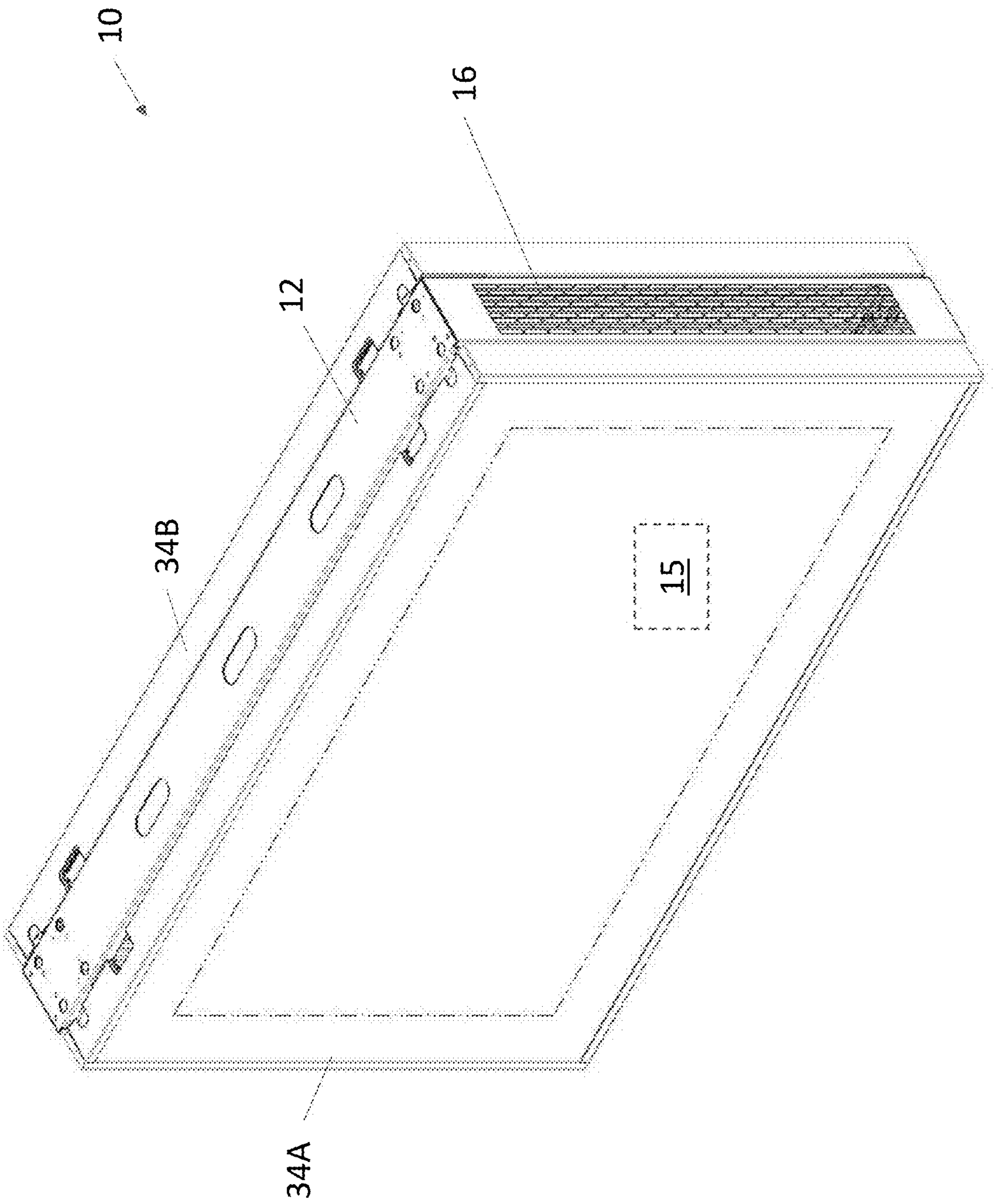
FIG. 1 is a perspective view of an exemplary display assembly with a continuous, crossing, interconnected, internal airflow pathway for dual electronic displays.

FIG. 1 illustrates an exemplary unit 10. The display assembly 10 may include a structural framework 12. The structural framework 12 may comprise one or more panels and/or members. The members of the structural framework 12 may be arranged in a generally rectangular shape, though other sizes and/or shapes may be utilized. The structural framework 12 may be configured for mounting at or to a ground surface (e.g., a city sidewalk), a vehicle, an item of street furniture (e.g., bus shelter, phone booth, utility box, utility pole, newspaper stand, poster display, former and/or retrofitted versions thereof, combinations thereof, or the like), a wall, combinations thereof, or the like. The structural framework 12 may, at least in part, form a housing or other full or partial enclosure for electronic displays 18A, 18B and/or other internal components 15 of the unit 10.

The display assembly 10 may comprise one or more vents 16. The vent(s) 16 may be configured to accept and/or exhaust ambient air from the units 10. Various number of vents 16 may be provided at various places. The vents 16 are preferably located at or towards a top and bottom of the units 10, such as in panels of the structural framework 12 or display subassembly 34A, 34B connected thereto.

The display assembly 10 may comprise at least two display subassemblies 34A, 34B. The display subassemblies 34A, 34B may be arranged on opposing sides of the structural framework 12, such as in the back-to-back arrangement. Other number and/or arrangement of the display subassemblies 34 may be utilized.

The vents 16 may be dedicated to the display subassemblies 34A, 34B and/or may be common to some or all of the display subassemblies 34 such that separate vents 16 are not required for each display subassembly 34.

The units 10 may comprise one or more internal components 15. The internal components 15 may include one or more of: electronic displays 18, airflow pathways, fans 30, video players, sensors (e.g., temperature, pressure, humidity, location/GPS, light (e.g., ambient light, display illumination), combinations thereof, or the like), controllers for the same, network connectivity devices (e.g., routers, modems, antenna, combinations thereof, or the like), VOIP equipment, emergency calling equipment, heat exchangers (e.g., air to air type, multilayer, combinations thereof, or the like), combinations thereof, or the like. The internal components 15 may support operation of the display assembly 10. The illustrated location, number, size, shape, and/or the like of the internal components 15 is exemplary and not intended to be limiting.

Figure 2:
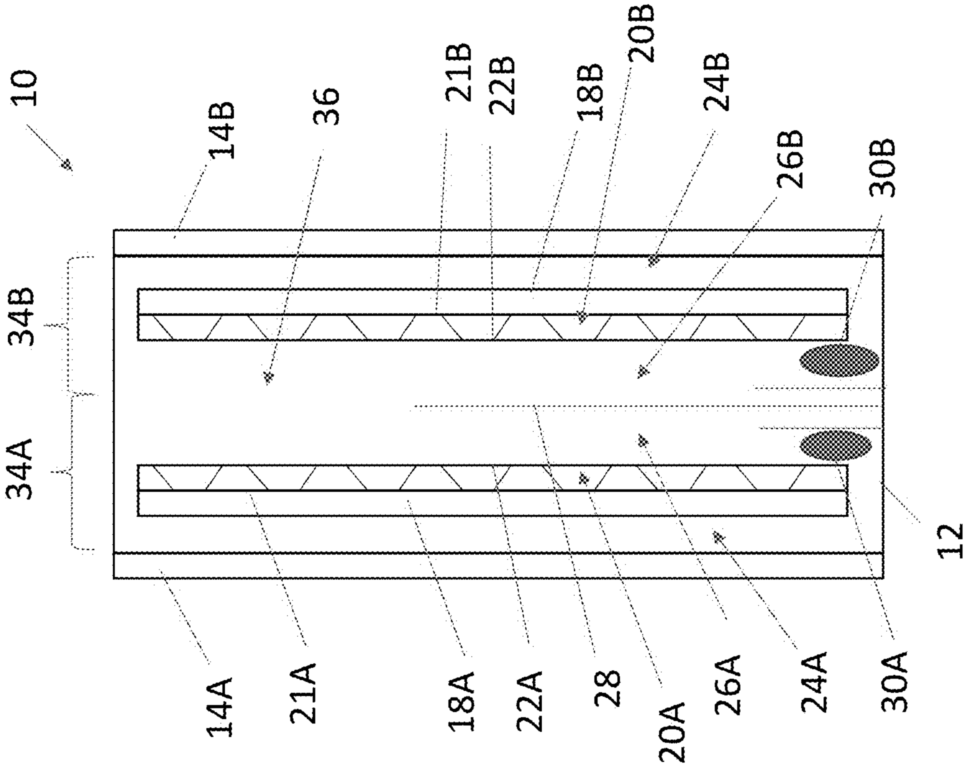
FIG. 2 is a top sectional view of the FIG. 1 display assembly.

As illustrated with particular regard to FIG. 2, each of the display subassemblies 34A, 34B may comprise one of the electronic displays 18A, 18B. The display subassemblies 34 may be movable connected to the structural framework 12, such as by way of hinges, gas struts, members, pins, combinations thereof, or the like.

Each of the electronic displays 18 may comprise a liquid crystal type display, though other types of displays may be utilized, such as but not limited to, organic light emitting diode, light emitting diode, plasma, combinations thereof, or the like. Some or all of the electronic displays 18 may optionally be touch sensitive.

Each of the electronic displays 18A, 18B in exemplary embodiments, without limitation, may comprise a liquid crystal layer, a backlight 17A, 17B (preferably direct, but optionally edge lit), one or more polarizers, anti-reflective films, optical layers or coatings, combinations thereof, or the like.

Each of the display subassemblies 34A, 34B may comprise a cover 14A, 14B. The electronic displays 18A, 18B may be positioned behind, and optionally spaced apart from the covers 14A, 14B, respectively. Each of the covers 14 may comprise a single layer or multiple layers. The covers 14 may comprise glass, one or more polymers (e.g., acrylic), polarizer(s), anti-reflective films, combinations thereof, or the like. The covers 14 may be transparent or translucent, such as to allow viewing therethrough.

The display assemblies 10 may comprise one or more open airflow pathways. The open airflow pathway(s) may comprise and/or be fluidly connected to the vents 16. Each of the display subassemblies 34A, 34B may comprise an open channel structure 22A, 22B defining, at least in part, open channels 20A, 20B, respectively, for ambient air. The open channels 20 may be part of one or more of the open airflow pathways. The channel structures 22 and/or open channels 20 may extend along, and optionally directly along, a rear of the electronic displays 18. For example, without limitation, the open channels 20 may be defined, at least in part, by a rear surface of the backlight 17 of the electronic displays 18.

The open channel structures 22 may be configured to allow ambient air to travel along, or directly along, a rear of the backlight 17 of the electronic displays 18. Corrugation 23A, 23B, fins, heat pipe, and/or other surface features may optionally be provided within one or both of the open channel structures 22A, 22B, such as to increase surface area or otherwise increase heat transfer.

Fans may be provided along some or all of the one or more open airflow pathways to cause, control, and/or influence a flow of ambient air through the one or more open airflow pathways. The fans may be provided interior to the vents 16, by way of non-limiting example.

The display assemblies 10 may comprise one or more closed airflow pathways. In exemplary embodiments, without limitation, a common closed area 36 may be located rearward of, and/or defined at least in part by, a rear surface or surfaces of the open channel structures 22 and/or display subassemblies 34.

The common closed area 36 may be fluidly connected to forward channels 24A, 24B extending within the display subassemblies 34A, 34B, respectively. In exemplary embodiments, without limitation, each of the forward channels 24A, 24B extends between and/or is defined, at least in part by, the covers 14A, 14B and the electronic displays 18A, 18B, respectively.

A gap may be provided at the sides and/or top and bottom of the electronic displays 18 to facilitate the flow of gas around the electronic displays 18, such as part of the one or more closed airflow pathways. In this way, the forward channels 24A, 24B may be connected at opposing sides to the common, closed area 36, thereby allowing circulating gas 38 to travel through the forward channels 24.

A barrier 28 may extend within a portion of the common, closed area 36. The barrier 28 may be a panel or other planar or substantially (e.g., within 10%) planar object, though various shapes and/or sizes may be utilized.

The barrier 28 may extend a distance into the common closed area 36. In exemplary embodiments, without limitation, the barrier 28 extends at least halfway through the common closed area 36 but less than three-quarters of the way therethrough. However, other sizes and/or shapes may be utilized.

In exemplary embodiments, without limitation, the barrier 28 extends parallel or substantially (e.g., within 10%) parallel with a rear surface of the display subassemblies 34 and/or the open channel structures 22A, 22B thereof. Alternatively, or additionally, the barrier 28 may be equally, or substantially (e.g., within 10%) equally, spaced between the display subassemblies 34 and/or the open channel structures 22A, 22B thereof. Alternatively, or additionally, the barrier 28 may be coextensive with at least a majority of a rear surface of the display subassemblies 34 and/or the open channel structures 22A, 22B thereof. For example, without limitation, the barrier 28 may have a surface area of a size between about 51% and 76% of a surface area of one or both of the rear surface of the display subassemblies 34 and/or the open channel structures 22A, 22B thereof. Alternatively, or additionally, the barrier 28 may be coextensive with less than a majority of the rear surface of the display subassemblies 34 and/or the open channel structures 22A, 22B thereof. For example, without limitation, the barrier 28 may have a surface area of a size between about 49% and 5% of a surface area of one or both of the rear surface of the display subassemblies 34 and/or the open channel structures 22A, 22B thereof.

The barrier 28 may define, at least in part, a first portion 26A of the common, closed area 36 from a second portion 26B of the common, closed area 36. While the first and second portions 26A, 26B may be fluidly interconnected, the barrier 28 may serve to separate, at least in part, the common closed area 36, for example such that air may not flow through the barrier 28. This may encourage airflow into the forward channels 24A, 24B, respectively. A third portion 26C of the common, closed area 36 may connect the first and second portions 26A, 26B. The barrier 28 may not extend into or through the third portion 26C. This may allow airflow to cross between the channels 24A, 24B.

Fans 30 may be provided along the one or more closed airflow pathways to move, control, and/or influence movement of the circulating gas. In exemplary embodiments, without limitation, a set of one or more of the fans 30A, 30B is provided for each of the display subassemblies 34A, 34B and may form part of such display subassemblies 34. For example, without limitation, each set of the fans 30 may be attached to a rear surface of the channel structures 22 and/or electronic displays 18 thereof. The fans 30 may comprise centrifugal type fans which may be positioned within a housing comprising and/or connected to ducting for directing air into and/or out of the forward channels 24. Other number and/or arrangement of the fans 30 may be provided. The fans 30 may pull air from the closed, common area 36 and/or push the air into the front channels 24. The barrier 28 may serve, at least in part, to separate the fans 30A, 30B.

Optionally, but preferably, a display channel 21A, 21B forming part of the closed airflow pathway is also provided within each of the electronic displays 18A, 18B, such as between a respective display (e.g., liquid crystal) layer 19A, 19B and backlight layer 17A, 17B thereof. The display channels 21 may allow a first portion of a flow of the circulating gas 38 to travel within the front channels 24 and a second portion of the flow of the circulating gas 38 to travel within display channels 21. The first and second portions of the flow of the circulating gas 38 may travel in parallel or substantially (e.g., within 10%) parallel and/or simultaneously and/or substantially (e.g., within 10%) simultaneously. In this way, the circulating gas 38 may extend along both a forward and rear surface of an optical stack comprising a display layer 19 (e.g., liquid crystal layer) of the electronic display 18.

Where more than two display subassemblies 34 are provided, the common closed area 36 may be common to all such display subassemblies 34, with one of the barriers 28 provided between each set of two of the display subassemblies 34.

Figure 3:
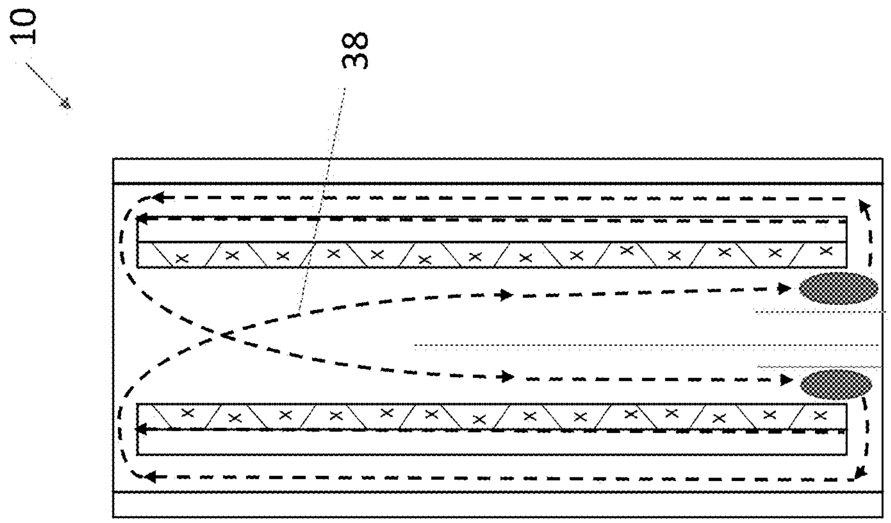
FIG. 3 is a top sectional view of FIG. 2 with an exemplary generalized airflow pattern.
Figure 4:
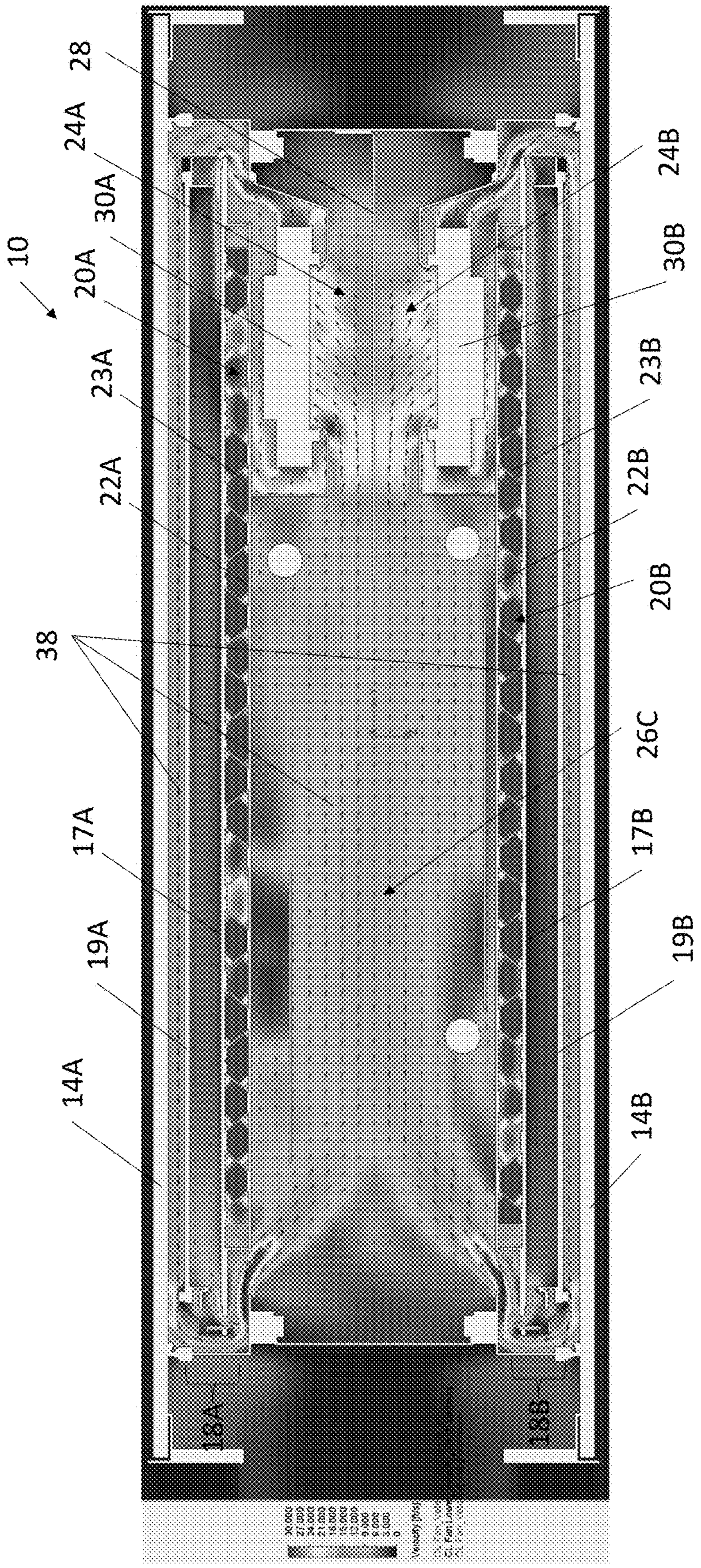
FIG. 4 is a top sectional view of FIG. 3, oriented in landscape, with an exemplary flow velocity analysis.

As illustrated with particular regard to FIG. 3, the display assembly 10 and/or certain components thereof may create a crossing, interconnected airflow pathway for circulating gas 38, such as when the fans 30 are activated. FIG. 4 illustrates an exemplary flow velocity diagram for the display assembly 10 demonstrating exemplary flow through the display assembly 10 by way of non-limiting example.

When activated, the fans 30 may create the continuous, crossing, interconnected airflow of the circulating gas 38 between the display subassemblies 34. In exemplary embodiments, without limitation, the circulating gas 38 may travel through the fan 30A of the first one of the display subassemblies 34A and into the front channel 24A thereof before exiting the front channel 24A into the closed, common area 36 where the circulating gas 38 is guided and/or confined by the barrier 28 through the fan 30B of a second one of the display subassemblies 34B and into the front channel 24B thereof before returning to the closed, common area 36 where it is guided and/or confined by the barrier 28 to the fan 30A of the first one of the display subassemblies 34A to make a circuit.

The illustrated flow is intended to be generalized. As those of skill in the art will recognize, individual molecules may vary in the exact pathway and thus the illustrated airflow pattern is intended to provide a generalized flow pattern, such as for most, all, or substantially (e.g., 90% or more) all of the airflow. The exact pathway along the generalized route may vary. The barrier 28 may serve to capture exiting airflow from one of the front channels 24 and move that air towards the opposite one of the front channels 24 from which it exited.

The closed airflow pathway(s) may be separated from ambient and/or the open airflow pathway(s), such as in accordance with at least ingress protection (IP) code 55 or higher available from the International Electrotechnical Commission of Geneva Switzerland. E.g., https://www.iec.ch/ip-ratings. More preferably, but optionally, such separation may be in accordance with at least IP 65 or higher.

Figure 5:
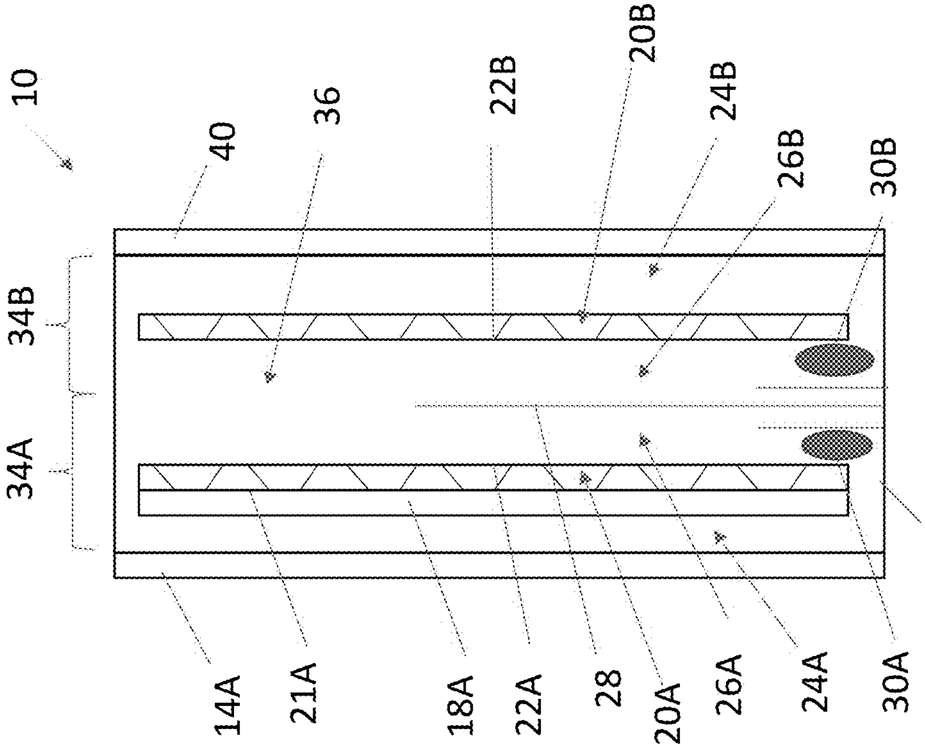
FIG. 5 is a top sectional view of another exemplary embodiment of the FIG. 1 display assembly.

While the display assemblies 34 are sometimes shown and/or described as having an electronic display 18, a poster cavity (e.g., for static, optionally illuminated poster), blank panel, or the like may be provided instead. For example, without limitation, an access panel 40 may be provided, such as illustrated with particular regard to FIG. 5, by way of non-limiting example. The access panel 40 may comprise a metal and/or glass (e.g., with printed black ink and/or black frit). The use of glass, in particular, may assist with reducing condensation formation. The access panel 40 may be provided as a door, though other types or kinds of access panels may be provided. In such embodiments, the open channel structures 22 may not be required, but may optionally be provided. In such embodiments, the electronic display 18 may not be required. The access panel 40 may replace the cover 14B in exemplary embodiments.

Figure 6:
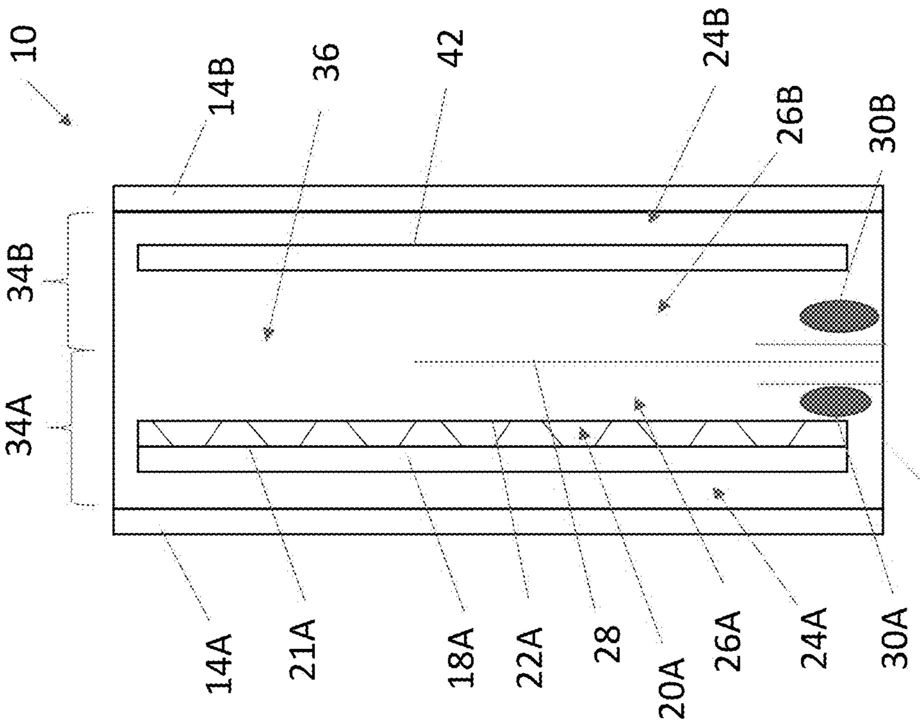
FIG. 6 is a top sectional view of another exemplary embodiment of the FIG. 1 display assembly.

As another example, without limitation, a poster holder 42 may be provided, such as illustrated with particular regard to FIG. 6, by way of non-limiting example. The poster holder 42 may comprise a panel, compartment, or the like. The poster holder 42 may be configured to hold static signage. Optionally, the poster holder 42 may comprise illumination, such as LEDs provided along edges thereof to illuminate such static signage. The cover 14B may be provided forward of the poster holder 42 in exemplary embodiments.

Figure 8:
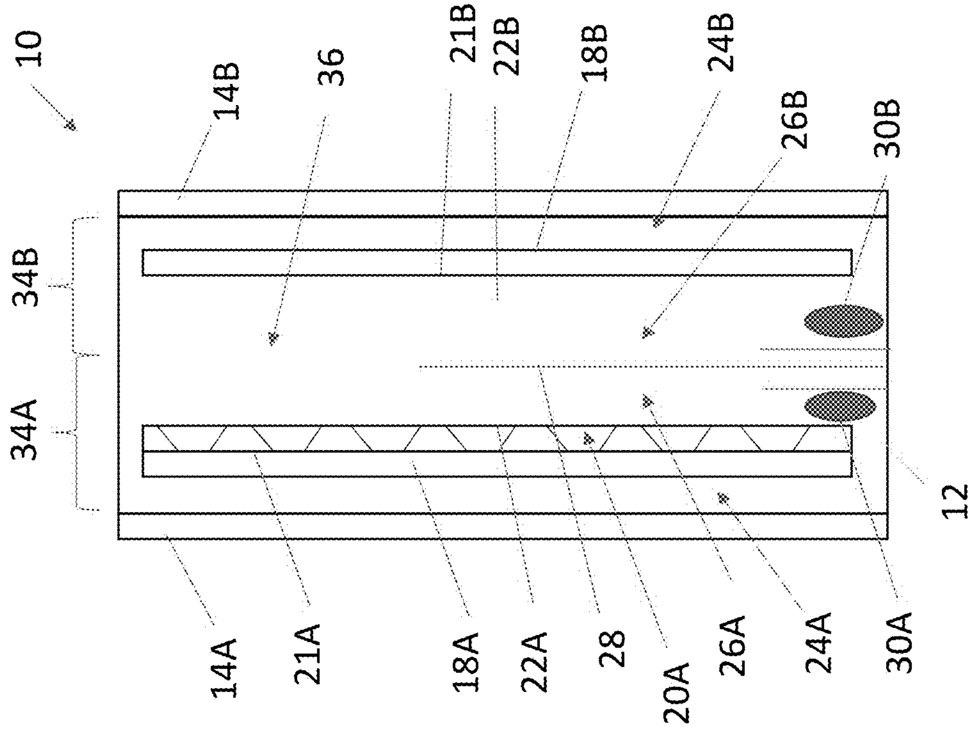
FIG. 8 is a top sectional view of another exemplary embodiment of the FIG. 1 display assembly.
Figure 7:
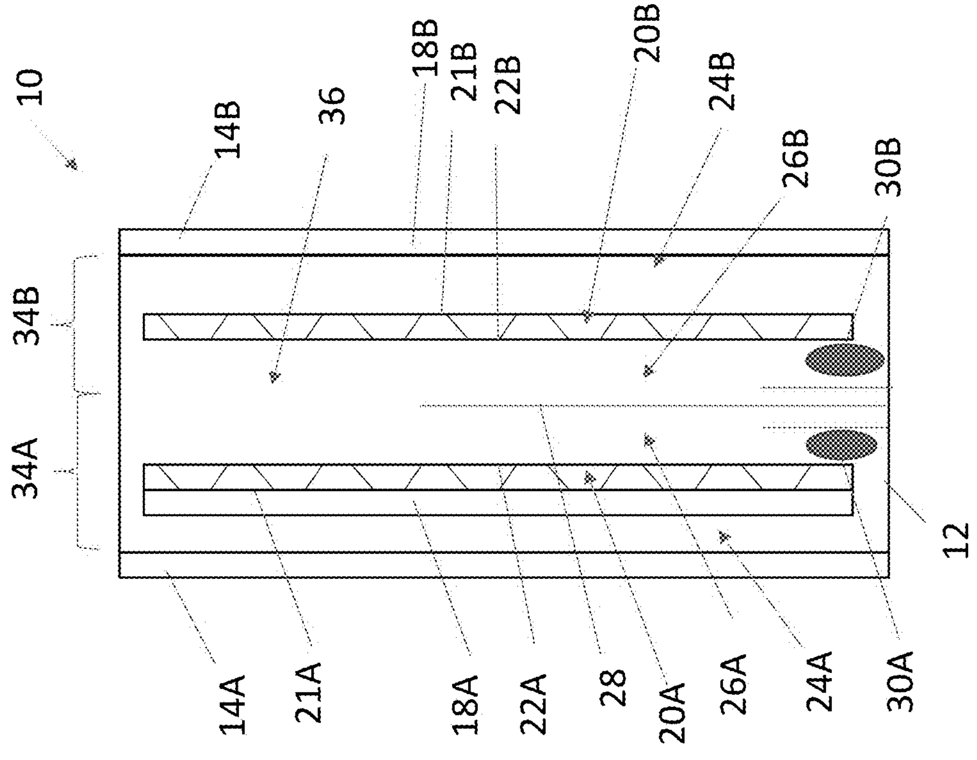
FIG. 7 is a top sectional view of another exemplary embodiment of the FIG. 1 display assembly.

In yet other exemplary embodiments, the electronic display 18 and/or open channel structures 22 may be provided but without certain other components, such as power supplies and/or other electronics for the electronic display 18, including but not necessarily limited to the display layer 19 and/or backlight 17, the open channel structure 22B, combinations thereof, or the like. Non-limiting examples of the foregoing are provided in FIG. 7 and FIG. 8, without limitation.

Any embodiment of the present invention may include any of the features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention.

Certain operations described herein may be performed by one or more electronic devices. Each electronic device may comprise one or more processors, electronic storage devices, executable software instructions, combinations thereof, and the like configured to perform the operations described herein. The features and/or functionality shown and/or described herein may be accomplished by way of stored, executable software instructions, such as in the form of applications, programs, routines, combinations thereof, or the like. The electronic devices may be general purpose computers or specialized computing devices. The electronic devices may comprise personal computers, smartphones, tablets, databases, servers, or the like. The electronic connections and transmissions described herein may be accomplished by one or more wired or wireless connectivity components (e.g., routers, modems, ethernet cables, fiber optic cable, telephone cables, signal repeaters, and the like) and/or networks (e.g., internets, intranets, cellular networks, the world wide web, local area networks, and the like). The computerized hardware, software, components, systems, steps, methods, and/or processes described herein may serve to improve the speed of the computerized hardware, software, systems, steps, methods, and/or processes described herein. The electronic devices, including but not necessarily limited to the electronic storage devices, databases, controllers, or the like, may comprise and/or be configured to hold, solely non-transitory signals.

What is claimed is:

1. A display assembly with a continuous, crossing, interconnected internal airflow pathway network, said display assembly comprising:

a first and second display subassembly, each comprising a cover and a forward channel located interior to the cover, at least one of said first and second display subassembly comprising an electronic display located interior to, and spaced apart from, the cover;

a common closed area provided, at least in part, between the first and second display subassembly, wherein the common closed area is fluidly connected to the forward channel of the first display subassembly and of the second display subassembly; and a barrier extending within the common closed area between, and spaced apart from, the first and second display subassembly, said barrier partially partitioning the common closed area;

wherein the internal airflow pathway network is fluidically separated from direct exchange with an ambient environment.

2. The display assembly of claim 1 wherein:

the barrier extends at least substantially parallel with a rear surface of the first and of the second display subassembly.

3. The display assembly of claim 2 wherein:

the barrier is coextensive with between 76% and 5% of the rear surface of the first and of the second display subassembly.

4. The display assembly of claim 3 wherein:

the barrier is coextensive with less than 50% of the rear surface of the first and of the second display subassembly.

5. The display assembly of claim 3 wherein:

the barrier is coextensive with at least 51% of the rear surface of the first and of the second display subassembly.

6. The display assembly of claim 1 wherein:

each of said first and second display subassembly comprise the electronic display.

7. The display assembly of claim 6 wherein:

the forward channel is defined, at least in part, by the cover and the electronic display of the respective one of the first and second display subassembly.

8. The display assembly of claim 1 wherein:

the electronic display of each of the first and second display subassembly comprises a liquid crystal layer and a backlight for the liquid crystal layer.

9. The display assembly of claim 1 further comprising:

a first set of one or more fans provided at a first side of the barrier; and a second set of one or more fans provided at a second side of the barrier.

10. The display assembly of claim 9 wherein:

the first and second set of one or more fans is provided within the common closed area.

11. The display assembly of claim 1 wherein:

said at least one of said first and second display subassembly comprises an open airflow channel interior to the electronic display; and the common closed area is interior to the open airflow channel.

12. The display assembly of claim 1 further comprising:

a structural framework supporting the first and second display subassembly on opposing sides thereof.

13. The display assembly of claim 12 wherein:

the structural framework and the cover of the first and second display subassembly form an enclosure for at least the electronic display.

14. The display assembly of claim 12 further comprising:

electronics for operating the display assembly located within the common closed area.

15. The display assembly of claim 1 wherein:

at least one other one of the first and second display subassembly comprises a poster holder.

16. The display assembly of claim 1 wherein:

at least one other one of the first and second display subassembly comprises an access panel.

17. The display assembly of claim 1 wherein:

the barrier extends at least substantially equidistant between a rear surface of the first and second display subassembly.

18. The display assembly of claim 1 wherein:

the forward channel of the first and second display subassembly and the common closed area define, at least in part, the internal airflow pathway network; and the fluidic separation of the internal airflow pathway network from the ambient environment at least meets ingress protection code 55.

19. A display assembly with a continuous, crossing, interconnected internal airflow pathway network, said display assembly comprising:

a structural framework;

a first and second display subassembly supported by the structural framework on a respective side thereof, each of the first and second display subassembly comprising:

a cover forming a forward portion of a respective side of the display subassembly;

an electronic display located interior to, and spaced apart from, the cover; and a forward channel defined, at least in part, by an interior surface of the cover and a forward surface of the electronic display;

a common closed area provided, at least in part, between a rear surface of the first and of the second display subassembly, wherein the common closed area is fluidly connected to the forward channel of the first and of the second display subassembly, the internal airflow pathway network comprising the forward channel of the first and of the second display subassembly and the common closed area;

a barrier extending within the common closed area between, and spaced apart from, the first and second display subassembly, said barrier extending over a portion of the common closed area, being coextensive with between 76% and 5% of the rear surface of the first and second display subassembly, and extending at least substantially parallel with, and at least substantially equidistant between, a rear surface of the first and second display subassembly, thereby partially partitioning the common closed area;

a first set of one or more fans provided within the common closed area at a first side of the barrier; and a second set of one or more fans provided within the common closed area at a second side of the barrier;

wherein the internal airflow pathway network is fluidically separated from direct exchange with an ambient environment.

20. A display assembly with a continuous, crossing, interconnected internal airflow pathway, said display assembly comprising:

a structural framework;

a first and second display subassembly supported by the structural framework on opposing sides thereof, each of the first and second display subassembly comprising:

a cover being transparent or translucent;

an electronic display located interior to, and spaced apart from, the cover, wherein the electronic display comprises a liquid crystal layer and a backlight for the liquid crystal layer;

a forward channel defined, at least in part, by an interior surface of the cover and a forward surface of the electronic display; and an open airflow channel interior to the electronic display;

a common closed area defined, at least in part, by a rear surface of the first and of the second display subassembly, wherein the common closed area is fluidly connected to the forward channel of the first and of the second display subassembly;

an internal airflow pathway comprising the forward channel of the first and of the second display subassembly and the common closed area, wherein the internal airflow pathway is fluidly separated from an ambient environment and the open airflow channel of the first and of the second display subassembly in a manner sufficient to meet at least ingress protection code 55;

a barrier extending within the common closed area between, and spaced apart from, the first and second display subassembly, said barrier extending over a portion of the common closed area, being coextensive with between 76% and 5% of the rear surface of the first and second display subassembly, and extending at least substantially parallel with, and at least substantially equidistant between, the rear surface of the first and second display subassembly, thereby partially partitioning the common closed area;

a first set of one or more centrifugal type fans provided within the common closed area at a first side of the barrier for moving circulating gas through the internal airflow pathway when activated;

a second set of one or more centrifugal type fans provided within the common closed area at a second side of the barrier for moving the circulating gas through the internal airflow pathway when activated; and electronics for operating the display assembly located within the common closed area;

wherein the structural framework and at least the cover of the first and second display subassembly form an enclosure for at least the electronic display of the first and of the second display subassembly and at least the electronics located within the common closed area;

wherein activation of the first and second set of one or more centrifugal type fans causes the circulating gas to at least partially mix within the common closed area, at least partially recirculate through a same one of the forward channels of the first and second display subassemblies, and partially recirculate through a different one of the forward channels of the first and second display subassemblies.

* * * * *